United States Patent
Mitchell et al.

(10) Patent No.: US 10,473,013 B2
(45) Date of Patent: Nov. 12, 2019

(54) INTEGRATIVE REDUCTANT SYSTEM AND METHOD USING CONSTANT VOLUME INJECTION

(71) Applicant: Cummins Emission Solutions, Inc., Columbus, IN (US)

(72) Inventors: Douglas Mitchell, Indianapolis, IN (US); A. Carl McDonald, Jr., Greenwood, IN (US)

(73) Assignee: Cummins Emission Solutions, Inc., Columbus, IN (US)

( * ) Notice: Subject to any disclaimer, the term of this patent is extended or adjusted under 35 U.S.C. 154(b) by 259 days.

(21) Appl. No.: 14/859,755

(22) Filed: Sep. 21, 2015

(65) Prior Publication Data

US 2016/0090887 A1 Mar. 31, 2016

Related U.S. Application Data

(60) Provisional application No. 62/055,963, filed on Sep. 26, 2014.

(51) Int. Cl.
*F01N 3/00* (2006.01)
*F01N 3/20* (2006.01)

(52) U.S. Cl.
CPC .......... *F01N 3/208* (2013.01); *F01N 2570/18* (2013.01); *F01N 2610/02* (2013.01); *F01N 2610/146* (2013.01); *F01N 2610/1453* (2013.01); *F01N 2900/1402* (2013.01); *Y02T 10/24* (2013.01)

(58) Field of Classification Search
CPC ................. F01N 2610/1453; F01N 3/2066
USPC ........................................... 60/274
See application file for complete search history.

(56) References Cited

U.S. PATENT DOCUMENTS

| | | | | |
|---|---|---|---|---|
| 6,050,088 A * | 4/2000 | Brenner | ................. | B01D 53/90 239/553.3 |
| 6,491,016 B1 * | 12/2002 | Buratti | ................. | F02D 41/3827 123/299 |
| 6,666,020 B2 * | 12/2003 | Tonetti | ................. | F02D 41/027 123/299 |
| 7,065,958 B2 * | 6/2006 | Funk | ................. | B01D 53/9431 60/286 |

(Continued)

FOREIGN PATENT DOCUMENTS

| EP | 1 799 975 | 6/2007 |
|---|---|---|
| EP | 2 192 280 | 6/2010 |

(Continued)

*Primary Examiner* — Jason D Shanske
(74) *Attorney, Agent, or Firm* — Foley & Lardner LLP

(57) ABSTRACT

Various embodiments relate to a selective catalytic reduction system for treating exhaust gases of an internal combustion engine. The system includes an inlet section that receives exhaust gases from the engine. The system includes a tank storing diesel exhaust fluid ("DEF"), a pump, a valve, and an injector each in fluid communication with each other. The injector is coupled to the inlet exhaust pipe and configured to inject DEF into the exhaust gases flowing through the inlet exhaust pipe in a plurality of pulses. Each of the plurality of pulses injects a constant volume of DEF into the inlet exhaust pipe. The system further includes a controller configured to operate the pump and the valve such that a time interval between successive constant volume pulses of the plurality of pulses is varied based on a variable oxides of nitrogen content of the exhaust gases.

3 Claims, 12 Drawing Sheets

(56) References Cited

U.S. PATENT DOCUMENTS

| | | | |
|---|---|---|---|
| 7,581,387 B2* | 9/2009 | Bui | F01N 3/101 60/274 |
| 7,842,266 B2* | 11/2010 | Takahashi | B01D 53/9409 423/212 |
| 7,866,144 B2 | 1/2011 | Bakaj et al. | |
| 8,505,280 B2 | 8/2013 | Maesse | |
| 8,640,448 B2 | 2/2014 | Geveci et al. | |
| 9,260,994 B2* | 2/2016 | Reeves | F01N 3/00 |
| 9,624,805 B2* | 4/2017 | Wentzel | F01N 3/208 |
| 2003/0109047 A1* | 6/2003 | Valentine | B01D 53/79 436/55 |
| 2003/0168039 A1* | 9/2003 | Ebelsheiser | F02B 3/10 123/299 |
| 2005/0137779 A1* | 6/2005 | Gioannini | F02D 41/029 701/103 |
| 2008/0060352 A1* | 3/2008 | Jozsa | B01F 3/04021 60/299 |
| 2009/0185954 A1 | 7/2009 | Qi et al. | |
| 2010/0139260 A1* | 6/2010 | Rodman | B01F 3/04049 60/303 |
| 2010/0170225 A1* | 7/2010 | Opris | F01N 3/2066 60/286 |
| 2010/0300074 A1* | 12/2010 | Mullins | F01N 3/0253 60/286 |
| 2011/0066354 A1* | 3/2011 | Cassani | F01N 3/0253 701/103 |
| 2011/0219745 A1* | 9/2011 | Griffin | B01F 3/04049 60/274 |
| 2011/0239625 A1* | 10/2011 | Fokkelman | F01N 3/206 60/286 |
| 2012/0096838 A1* | 4/2012 | Sandberg | B01F 3/04049 60/274 |
| 2013/0240040 A1 | 9/2013 | Kleinknecht | |
| 2013/0340412 A1* | 12/2013 | Ichikawa | F01N 3/08 60/286 |
| 2014/0134062 A1* | 5/2014 | Kwon | F01N 3/2066 422/170 |
| 2015/0121855 A1* | 5/2015 | Munnannur | F01N 3/2066 60/295 |
| 2016/0032801 A1* | 2/2016 | Alig | F01N 3/208 60/274 |

FOREIGN PATENT DOCUMENTS

| | | |
|---|---|---|
| WO | WO-2007/084690 | 7/2007 |
| WO | WO-2012/151442 | 11/2012 |

* cited by examiner

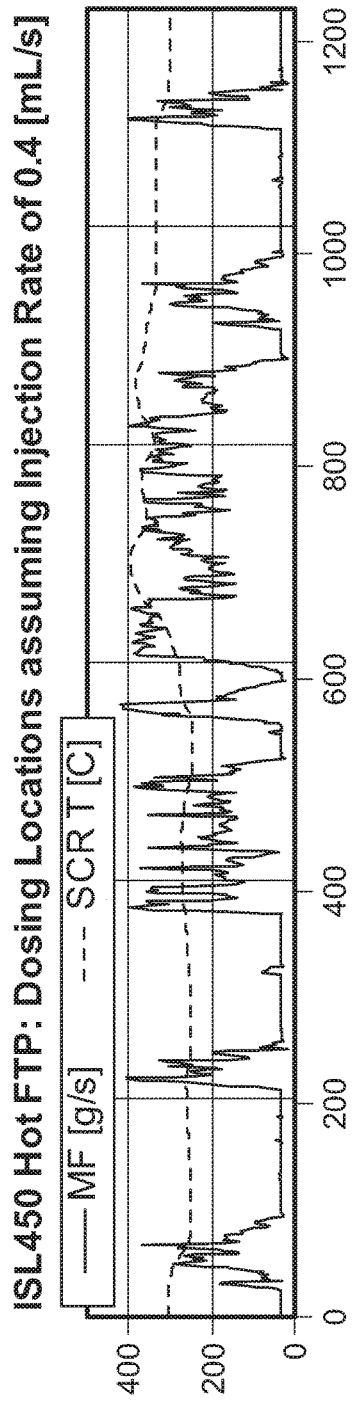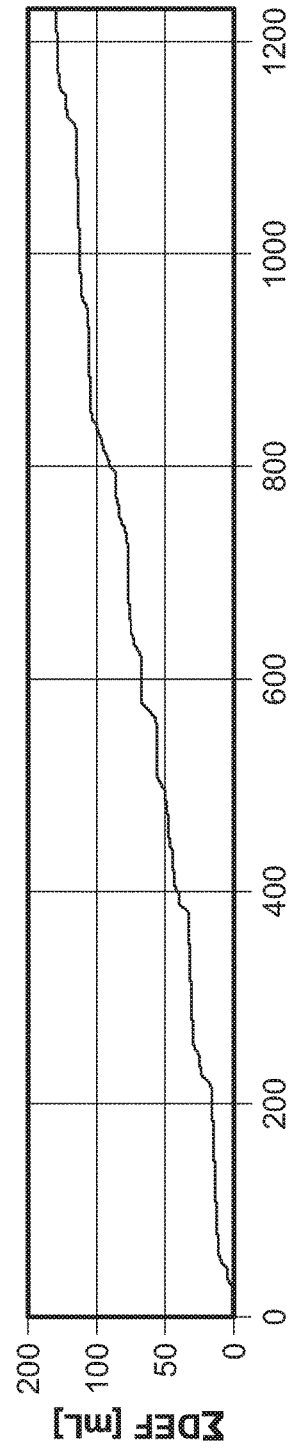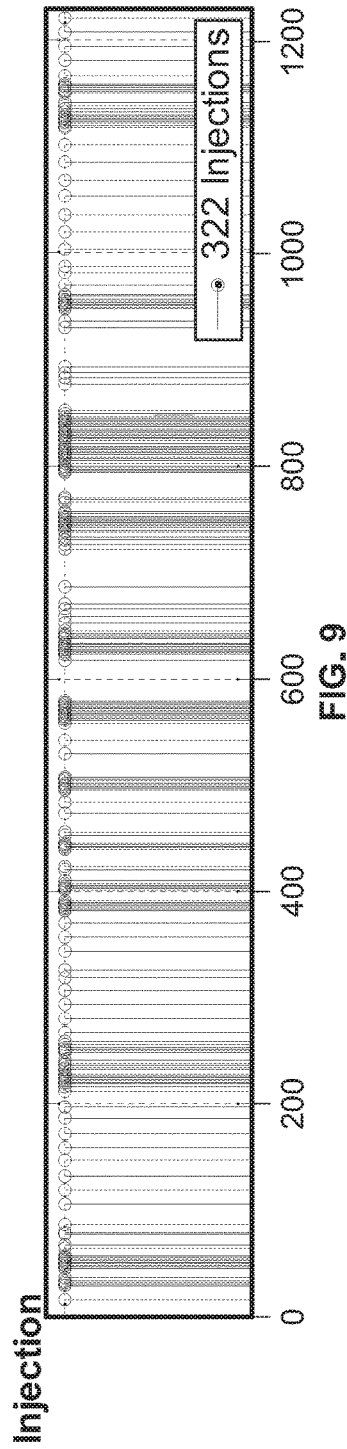

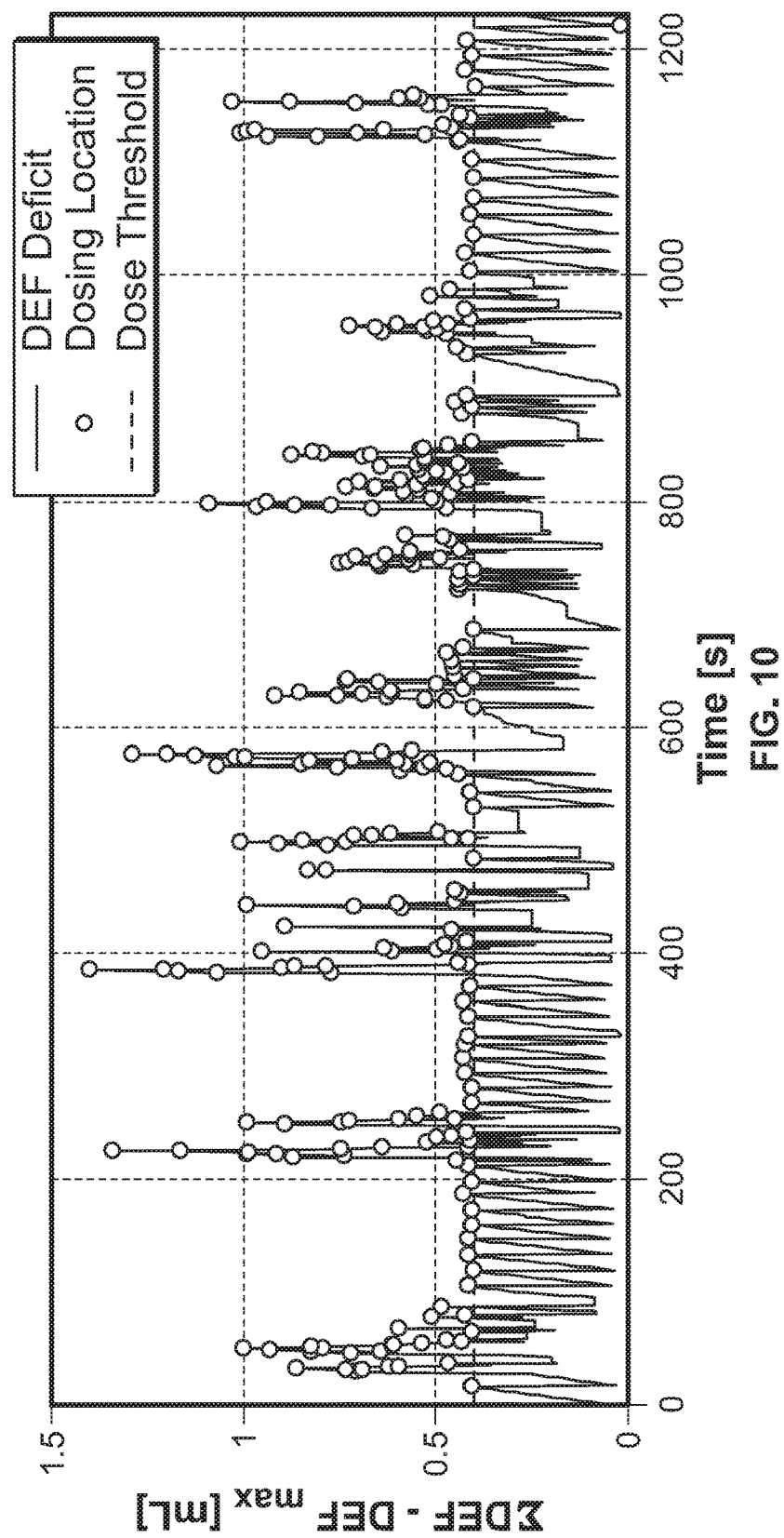

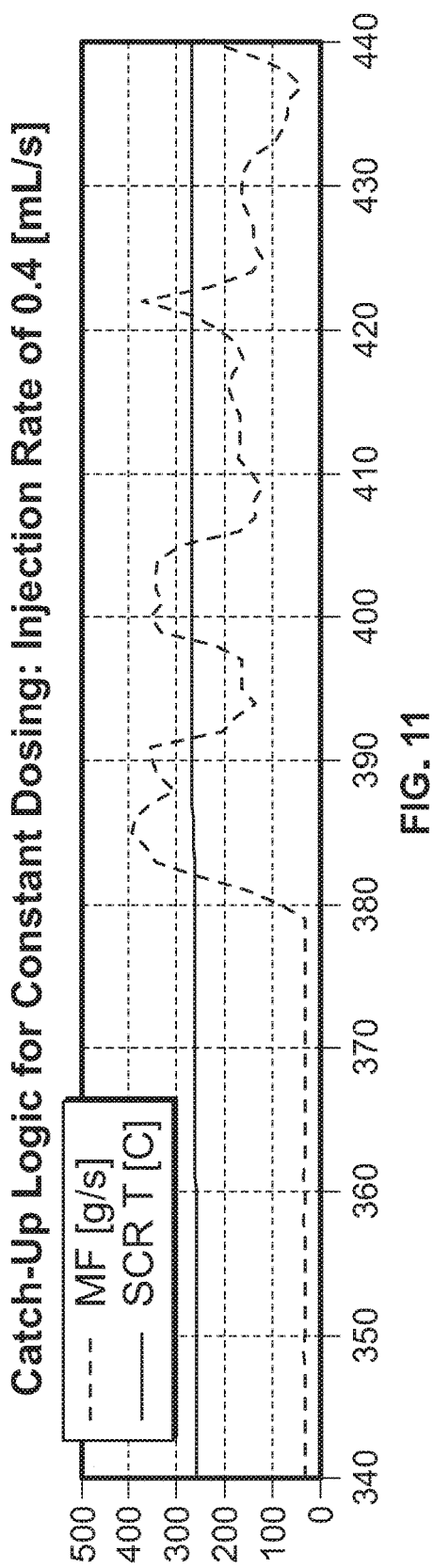

INTEGRATIVE REDUCTANT SYSTEM AND METHOD USING CONSTANT VOLUME INJECTION

CROSS-REFERENCE TO RELATED APPLICATIONS

This application claims priority to U.S. Provisional Patent Application No. 62/055,963, filed on Sep. 26, 2014, which is herein incorporated by reference in its entirety and for all purposes.

TECHNICAL FIELD

The present disclosure relates generally to exhaust aftertreatment systems for internal combustion engines.

BACKGROUND

Internal combustion engines generate exhaust gases during combustion. The exhaust gases often contain contaminants that, when left untreated, can harm the environment. The contaminants include oxides of nitrogen ("$NO_X$"), which can react with atmospheric air to form smog, ozone, and acid rain. Although there are many different oxides of nitrogen (e.g., nitrogen monoxide, nitrogen dioxide, nitrous oxide, nitroslyazide, nitrate radical, etc.) used herein, $NO_X$ primarily refers to nitrogen monoxide and nitrogen dioxide. Oxides of nitrogen other than nitrogen monoxide and nitrogen dioxide are not generally regulated by internal combustion engine emissions standards. Many regulatory territories (e.g., the United States, the European Union, India, China, etc.) regulate the amount of $NO_X$ that is permitted to vent into the ambient environment from internal combustion engines. Accordingly, exhaust aftertreatment systems are employed. For example, some internal combustion engines utilize a selective catalytic reduction ("SCR") system that injects diesel exhaust fluid ("DEF") into the exhaust stream. The DEF is a liquid that typically includes urea. When the urea is heated by the exhaust gases, the urea breaks down into ammonia, which reacts with $NO_X$ to form water and nitrogen thereby reducing $NO_X$ emissions.

Many SCR systems inject a variable dose of DEF into the exhaust stream (e.g., into an exhaust component carrying exhaust gases from the internal combustion engine) at constant time intervals. In such systems, the amount of DEF dosed into the exhaust stream is varied depending on the amount of $NO_X$ in the exhaust stream. For example, at engine idle speeds, a first amount of DEF may be dosed into the exhaust stream at a given time interval, and during higher than idle engine operating speeds, a second amount of DEF, which is larger than the first amount, may be dosed into the exhaust stream at the same given time interval. The fixed interval between successive doses may occur every millisecond.

However, such fixed interval, variable amount SCR systems have numerous drawbacks. Variable volume injectors can suffer from inaccurate doses of DEF (e.g., 20-30% error in the amount of DEF actually dosed vs. the amount of DEF intended to be dosed)—particularly at low volume doses of DEF. Further, under certain conditions, particularly at lower than normal exhaust gas temperatures (e.g., less than 200 degrees Celsius), excess DEF can form deposits or film on the various exhaust gas components. In some situations, deposits or film can form under normal operating conditions at locations where continual dosing can lower local temperatures on impingement surfaces even though there is adequate heat in the exhaust stream to decompose the DEF. Fixed interval, variable amount SCR systems can also require sophisticated controllers, high cost DEF pumps, and more complicated and less robust injectors.

Further, fixed interval, variable amount SCR systems often utilize a single reductant injector. The single injector continuously sprays the reductant into a component of the aftertreatment system, where the reductant is at least partially broken down into ammonia by the heat of the exhaust gases and the heat of the component of the aftertreatment system. However, the continuous spraying of the reductant into the component may result in localized cold spots on the wall of the component where the reductant contacts the component. The localized cold spots may inhibit the breakdown of the reductant into ammonia. Accordingly, reductant deposits and films can form in the areas of the cold spots of the component. Such deposits and films may be mitigated through heating of the component with a secondary heating device or through modulation of the quantity of reductant injected. However, these solutions require auxiliary emission control devices that can drive up the cost and complexity of the aftertreatment system.

SUMMARY

One example embodiment relates to an aftertreatment system for treating exhaust gases of an internal combustion engine. The system includes an inlet exhaust pipe configured to receive the exhaust gases from the internal combustion engine. The system includes a tank storing a reductant, such as DEF, a pump in fluid communication with the tank, a valve in fluid communication with the pump, and an injector in fluid communication with the valve. The injector is coupled to the inlet exhaust pipe and configured to inject the reductant into the exhaust gases flowing through the inlet exhaust pipe in a plurality of pulses. Each of the plurality of pulses injects a constant volume of reductant into the inlet exhaust pipe. The system further includes a controller configured to operate the pump and the valve such that a time interval between successive constant volume pulses of the plurality of pulses is varied based on a variable oxides of nitrogen content of the exhaust gases.

Another example embodiment relates to an aftertreatment system for treating exhaust gases of an internal combustion engine. The system includes an inlet exhaust pipe configured to receive the exhaust gases from the internal combustion engine. The system further includes a valve in fluid communication with a reductant source that provides a liquid reductant to the valve. The system includes an injection device in fluid communication with the valve. The injection device is coupled to the inlet exhaust pipe and is configured to inject the liquid reductant into the exhaust gases flowing through the inlet exhaust pipe in a plurality of pulses. Each of the plurality of pulses injects a constant volume of the liquid reductant into the inlet exhaust pipe. The system further includes a controller configured to operate the pump and the valve such that a time interval between successive constant volume pulses of the plurality of pulses is varied based on a variable oxides of nitrogen content of the exhaust gases.

A further example embodiment relates to a method. The method includes receiving, by a controller of an exhaust aftertreatment system for an internal combustion engine, feedback from an exhaust sensor of the exhaust aftertreatment system. The method further includes determining, by the controller, an amount of a liquid reductant to be injected into an inlet section of the exhaust after treatment system based at least in part on the feedback from the exhaust sensor. The method includes determining, by the controller, that the amount of the liquid reductant to be injected is equal to a threshold amount of liquid reductant. The threshold amount of liquid reductant is equal to a constant volume dose provided by an injector of the exhaust aftertreatment system. The method includes pulsing, by the controller, the injector to provide the constant volume dose of the liquid reductant based on determining that the amount of the liquid reductant to be injected is equal to the threshold amount.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIGS. 7 through 12 show test data for an exemplary differential DEF dosing system.

DETAILED DESCRIPTION

Referring to the figures generally, an SCR system that utilizes constant volume, variable timing reductant injection (e.g., a constant dose amount of DEF at variable time intervals between successive doses) to treat exhaust gases from a diesel internal combustion engine is described. The SCR system periodically injects a constant volume of reductant (such as DEF) into an exhaust system component (e.g., an exhaust pipe, a catalytic converter, etc.). The fixed volume of DEF is commensurate with the $NO_X$ reduction requirements for a given regulatory jurisdiction. The specific constant volume of DEF is tuned to reduce the likelihood that DEF films or deposits will form on the exhaust system component. The interval between the constant volume doses of DEF into the exhaust is adjusted based on the amount of $NO_X$ within the exhaust gases at a given point in time. The determined amount of $NO_X$ in the exhaust gases may be predicted, may be based on actual sensor feedback, or may be based upon a combination of both predictive information and actual sensor feedback. The interval between the constant volume doses is calculated by integrating the required DEF amount until a threshold amount of DEF (e.g., until one dose of DEF) is reached. The described fixed volume, variable timing DEF injection system costs less, is easier to control, has a simpler on-board diagnostic system, is more accurate, and is at less risk for DEF deposit and film formation than traditional fixed timing, variable volume DEF injection systems. Additionally, the use of multiple reductant injectors can be used to spread the injected reductant out over a larger area or be used in an alternating fashion to mitigate or prevent reductant deposits, reductant wall films, and localized cold spots within the aftertreatment system.

Figure 1:
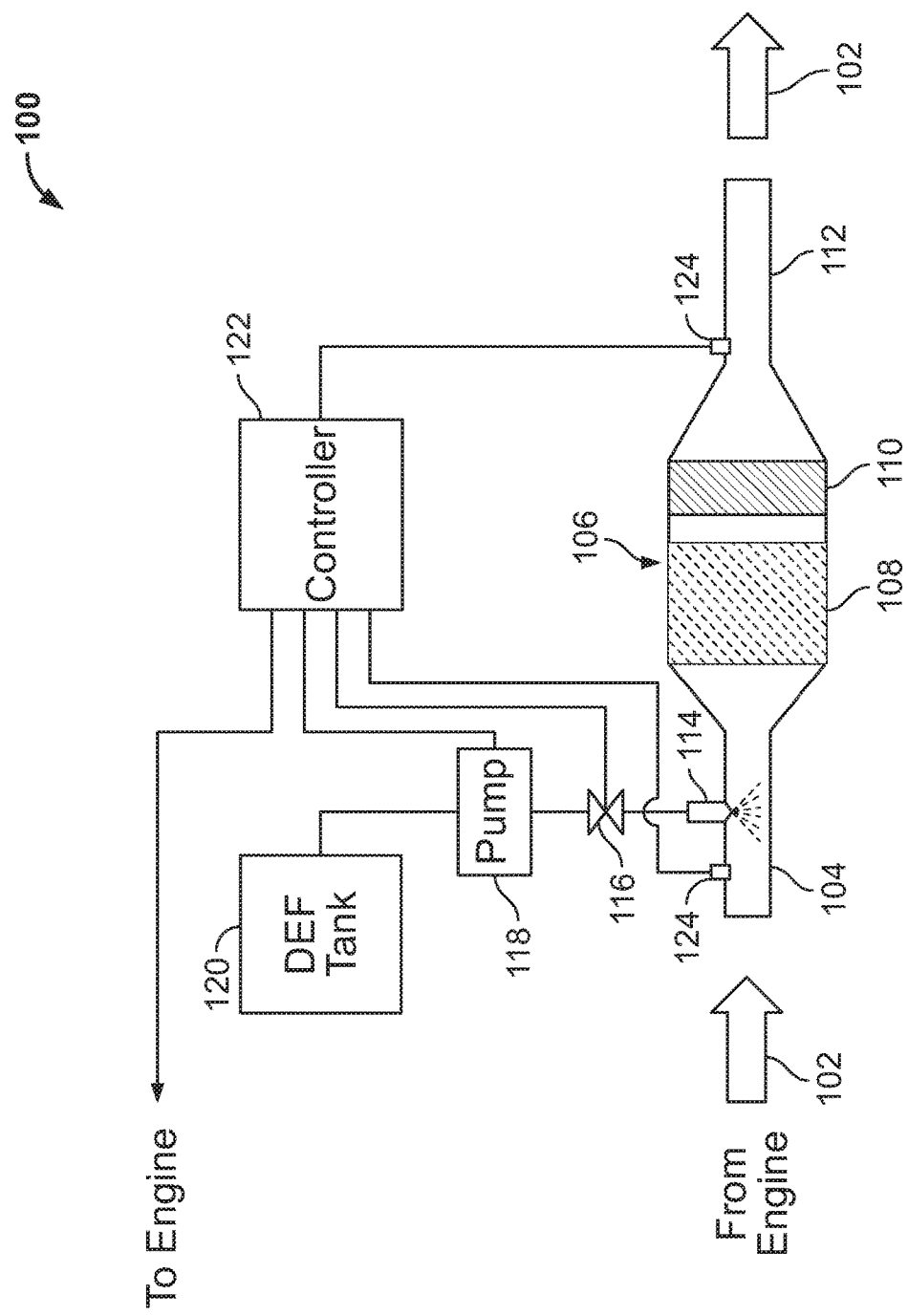
FIG. 1 is a schematic view of an SCR system according to an exemplary embodiment.

Referring to FIG. 1, a schematic view of an SCR system 100 is shown according to an exemplary embodiment. The SCR system 100 treats exhaust gases 102 from a diesel internal combustion engine. The SCR system 100 may be part of the exhaust aftertreatment system of a vehicle, an electrical generator, a water pump, or another diesel engine powered device. The exhaust gases 102 enter the SCR system through an inlet section 104 (e.g., an exhaust pipe) of the exhaust system. In some arrangements, the inlet section 104 is a decomposition reactor for the DEF. The inlet section 104 is in fluid communication with a catalyst assembly 106. The catalyst assembly 106 is positioned downstream of the inlet section 104 in an exhaust gas flow direction. The catalyst assembly 106 includes an SCR catalyst 108 that catalyzes the reaction between ammonia (provided via the DEF) and the $NO_X$ into nitrogen gas and water. The catalyst assembly 106 also includes a slip catalyst 110 positioned downstream of the SCR catalyst in an exhaust flow direction. The slip catalyst 110 catalyzes the breakdown of excess ammonia prior to the exhaust gases 102 exiting the SCR system via an outlet section 112. The outlet section 112 may route the treated exhaust gases 102 to additional exhaust aftertreatment components or out to the ambient environment.

The SCR system 100 injects doses of DEF fluid into the exhaust gases 102 at the inlet section 104. Accordingly, the SCR system 100 includes an injector 114 (or other form of insertion device), a valve 116, a pump 118, and a tank 120. The injector 114, the valve 116, the pump 118, and the tank 120 are each in fluid communication with each other. The tank 120 is configured to store DEF. The DEF includes urea that is heated by the exhaust gases 102 to form ammonia. The ammonia reacts with $NO_X$ in the exhaust gases 102 to form nitrogen gas and water. The reaction between the ammonia and the $NO_X$ is catalyzed by the SCR catalyst 108. The valve 116 may be a solenoid valve. Although shown as including a single injector 114, multiple injectors 114 may be included in the SCR system 100. In such an arrangement, the multiple injectors 114 may be controlled by a single valve 116 or by multiple valves 116, wherein each of the multiple valves 116 is associated with a single injector 114. The inlet section 104 can be sized and shaped to account for known spray patterns of the various injector 114 arrangements and for the specific fixed volume of DEF injected by the injectors 114 (or otherwise inserted) for a given application. Alternative injector arrangements are described below with respect to FIGS. 2-6.

The operation of the SCR system 100 is controlled by a controller 122. In some arrangements, the controller 122 is an open-loop controller. In certain embodiments, the controller 122 includes one or more modules structured to functionally execute the operations of the controller 122. The description herein including modules emphasizes the structural independence of the aspects of the controller 122, and illustrates one grouping of operations and responsibilities of the controller 122. Other groupings that execute similar overall operations are understood within the scope of the present application. Modules may be implemented in hardware and/or as computer instructions on a non-transient computer readable storage medium, and modules may be distributed across various hardware or computer based components.

The controller 122 receives feedback from at least one sensor 124 via a sensor feedback module. In the embodiment shown in FIG. 1, the controller 122 receives feedback from two sensors 124. A first of the sensors 124 is positioned upstream of the injector 114. A second of the sensors 124 is positioned downstream of the slip catalyst. Although shown as including two sensors 124, any number of sensors may be used with the SCR system 100. The sensors 124 may include any of $NO_X$ sensors, ammonia sensors, temperature sensors, pressure sensors, mass air flow sensors, or other sensors. The controller 122 may also receive data from the internal combustion engine control unit ("ECU") via an ECU feedback module. Such data may include the engine speed, fuel characteristics, intake air characteristics, and the like. In some arrangements, the controller 122 also functions as the engine control unit. The controller 122 operates the pump 118 and the valve 116 to periodically inject (or otherwise insert) constant volume doses of DEF from the tank 120 into the inlet section 104 via the injector 114 through an injector control module. The controller 122 instructs the periodic constant volume doses of DEF at variable time intervals between successive doses. Each dose or injection may be referred to as a pulse. Because each pulse of DEF into the inlet section 104 is a constant or fixed volume of DEF, the frequency of the pulses of DEF into the inlet section 104 controls the total amount of DEF injected. As described in further detail below, the time intervals between successive doses are calculated by integrating the amount of DEF required by the system 100 over time until a threshold amount of DEF is reached, and then instructing a dose of DEF when the threshold amount of DEF is reached. The time intervals may be determined by a timing module of the controller 122 or the injector control module of the controller 122. In some arrangements, the threshold amount of DEF is the fixed volume of DEF delivered with each dose.

Figure 2:
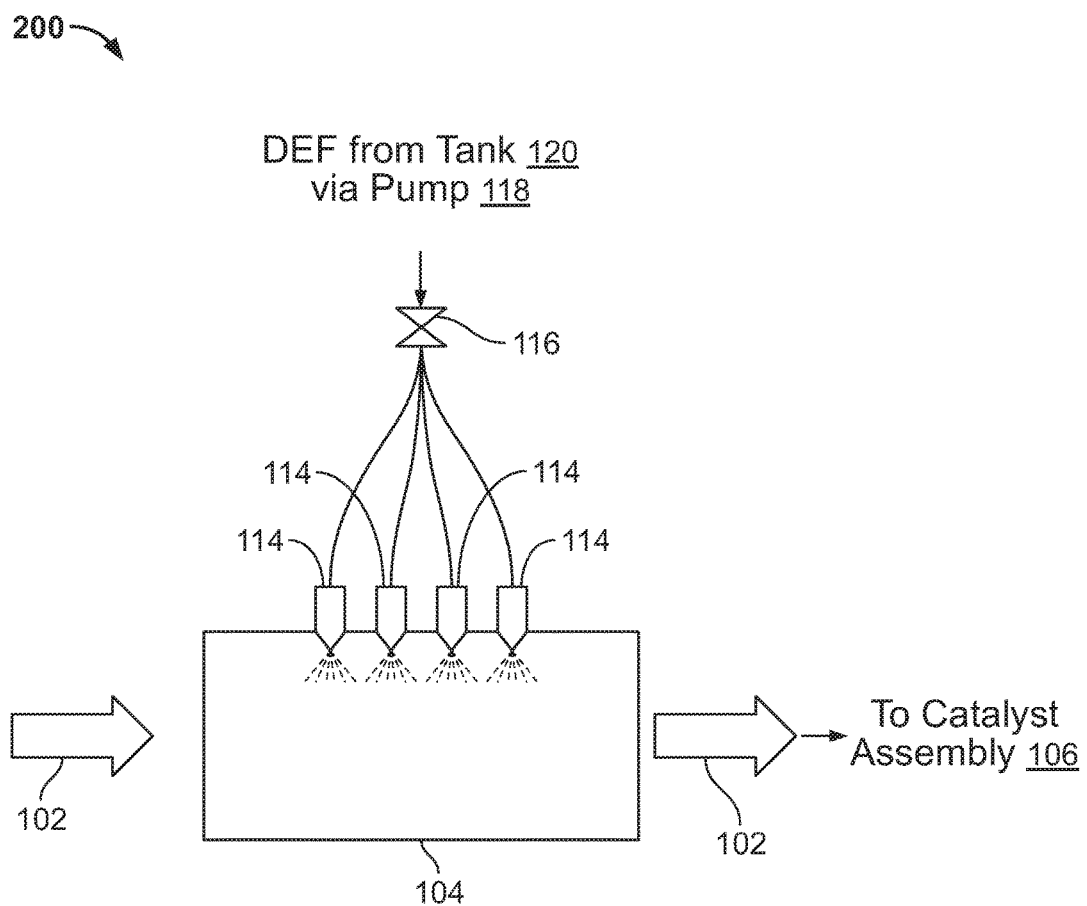
FIGS. 2 through 6 show cross-sectional views of the inlet section of the system of FIG. 1 having different injector arrangements according to various exemplary embodiments.

Referring to FIG. 2, a cross-sectional view of the inlet section 104 is shown with an exemplary injector arrangement 200. The injector arrangement 200 of FIG. 2 includes four separate injectors 114. Although four injectors 114 are shown, any number of injectors 114 may be arranged along the inlet section 104 (or another section) in a similar configuration. Each of the injectors 114 is configured to deliver a fixed amount of DEF into the inlet section 104 during each dose. A single valve 116 is in fluid communication with each of the four injectors 114 and provides DEF from the tank 120 to each injector 114 via the pump 118. When the valve 116 is opened and closed by the controller, a dose of DEF flows through each of the injectors.

Figure 3:
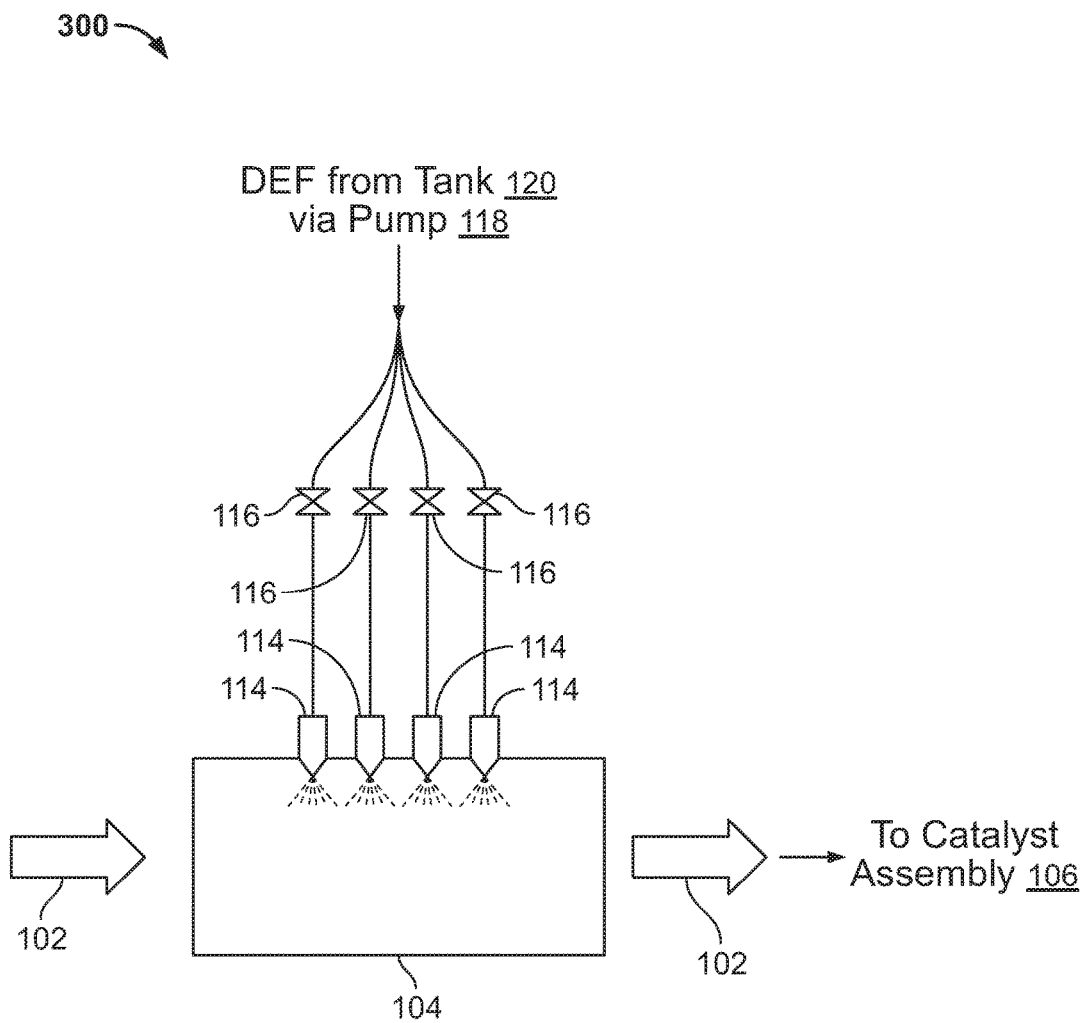

Referring to FIG. 3, a cross-sectional view of the inlet section 104 is shown with another exemplary injector arrangement 300. The injector arrangement 300 is similar to the injector arrangement 200 of FIG. 2. The primary difference between the injector arrangement 300 and the injector arrangement 200 is that each injector 113 of arrangement 300 has a dedicated valve 116. Accordingly, each injector 114 is individually actuable by the controller 122. Accordingly, in certain circumstances, the controller 122 can inject DEF into the inlet section 104 through less than all four of the injectors 114 (e.g., through one, two, or three of the injectors 114). Further, in the embodiment of FIG. 3 (as well as other embodiments described herein), each injector 114 may be controlled to inject a different constant dose of DEF than another injector 114. For example, a first injector 114 (e.g., the far left injector of FIG. 3) can be configured to deliver 0.30 mL of DEF with each dose, while a second injector 114 (e.g., the far right injector of FIG. 3) can be configured to deliver 0.15 mL of DEF with each dose.

Figure 4:
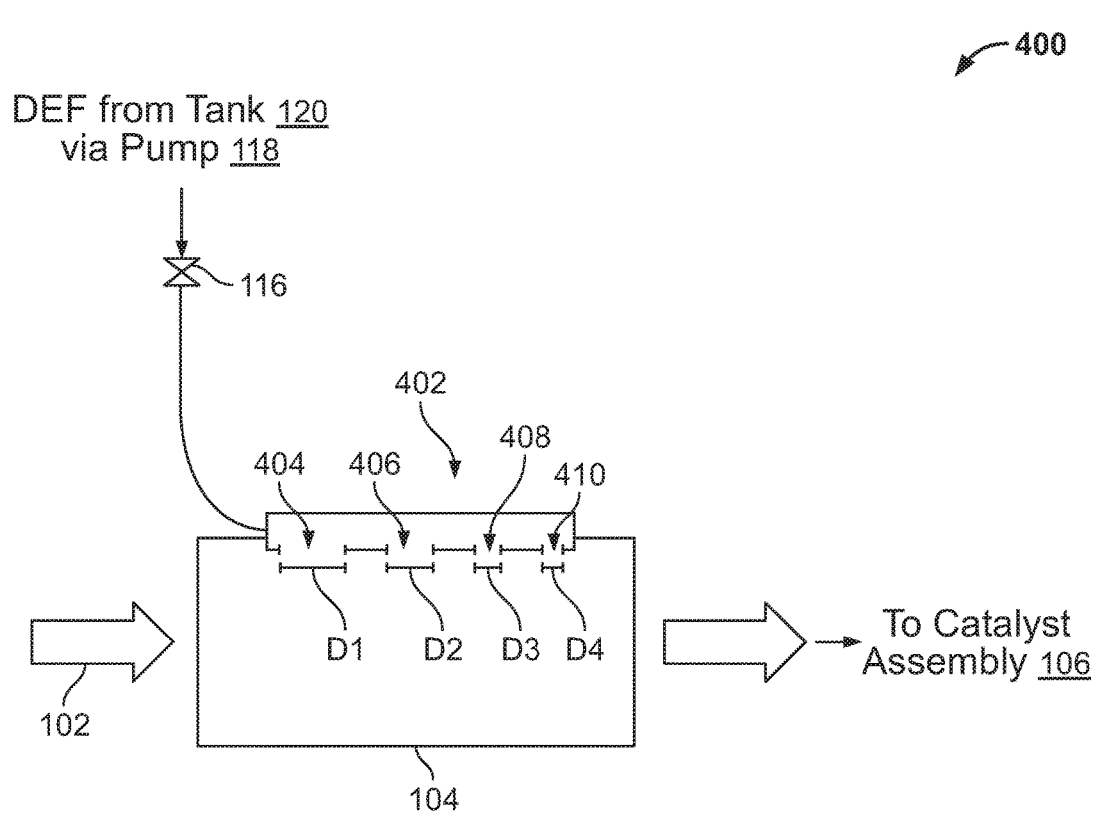

Referring to FIG. 4, a cross-sectional view of the inlet section 104 is shown with another exemplary injector arrangement 400. The injector arrangement 400 includes an injection tube 402 having a plurality of openings 404, 406, 408, and 410. Although the injection tube 402 is shown as having four openings, any number of openings can be present. The injection tube 402 is in fluid communication with the valve 116 such that the valve 116 provides the injection tube 402 with DEF from the tank 120 to each injector 114 via the pump 118. The provided DEF flows through the injection tube 402 and into the inlet section 104 through the plurality of openings 404, 406, 408, and 410. Each of the plurality of openings 404, 406, 408, and 410 has a respective opening size D1, D2, D3, and D4. In some arrangements, the plurality of openings 404, 406, 408, and 410 may be circular openings. In such arrangements, the opening sizes D1, D2, D3, and D4 are diameters of the respective openings. As shown in FIG. 4, each of the plurality of openings 404, 406, 408, and 410 has a decreasing respective opening size D1, D2, D3, and D4 (as viewed from left to right in FIG. 4). Each of the plurality of openings 404, 406, 408, and 410 is sized and shaped to deliver a different fixed amount of DEF for each dose of the injection tube 402. In an alternative arrangement, each of the plurality of openings 404, 406, 408, and 410 are similarly sized and shaped. In still another arrangement, some of the openings 404, 406, 408 and 410 may be similarly sized and/or shaped, while others are not similarly sized and/or shaped, e.g., two of the openings 404, 406 may be of one size, while the other openings 408 and 410 may be of another size.

Figure 5:
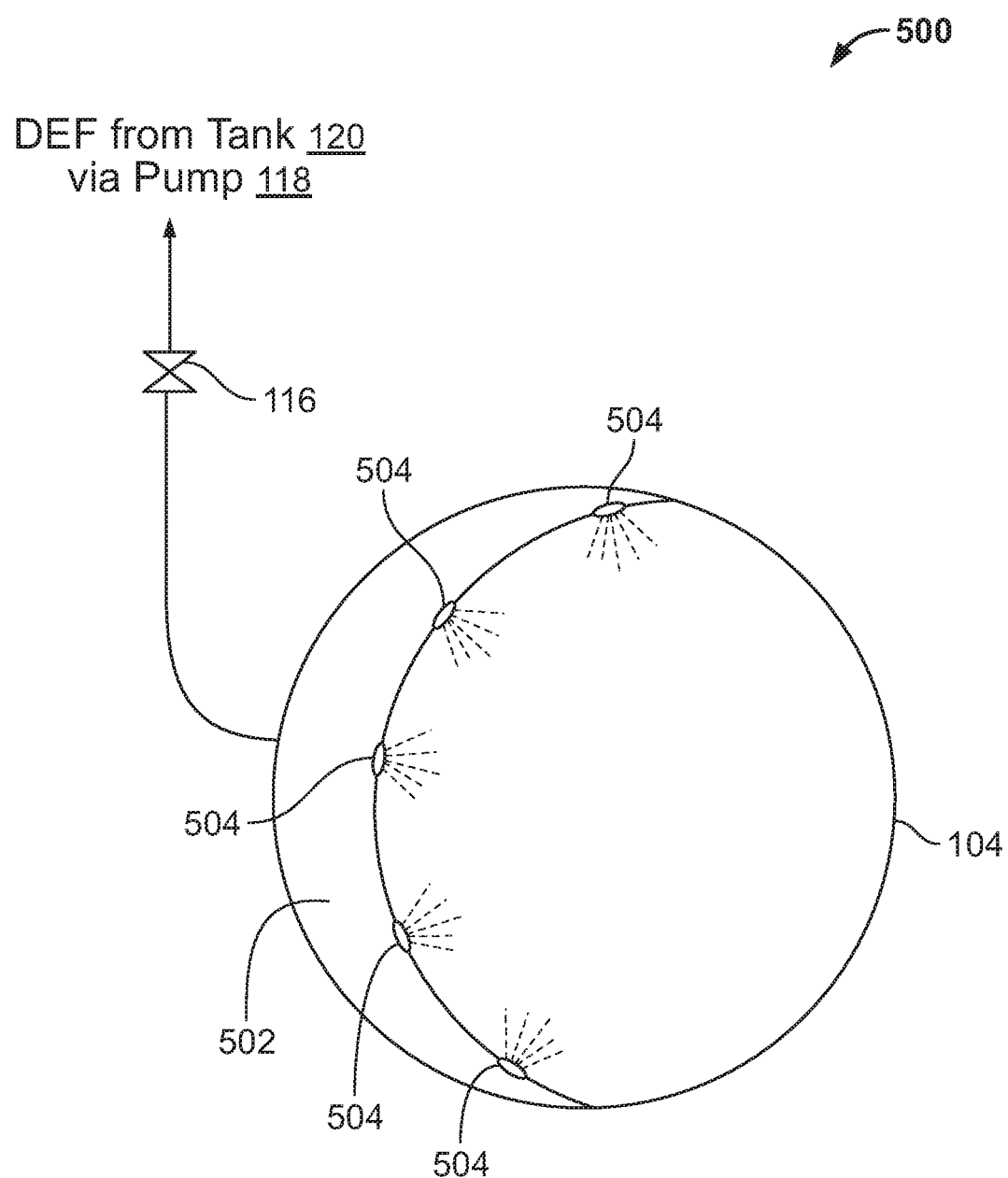

Referring to FIG. 5, a cross-sectional view of the inlet section 104 is shown with another exemplary injector arrangement 500. The injector arrangement 500 includes an injector insert 502. The injector insert 502 is generally crescent shaped. The injector insert 502 is inserted within the inlet section 104 and is coupled to the interior wall of the inlet section 104. The injector insert 502 includes five injector ports 504. The injector insert 502 is in fluid communication with the valve 116 such that the valve 116 provides the injector insert 502 with DEF from the tank 120 to each injector 114 via the pump 118. The provided DEF flows into the injector insert 502 and out the injector ports 504 into the inlet section 104. The injector ports 504 are oriented at different angles within the inlet section 104 about the center of the inlet section 104, which provides for a more even distribution of the DEF within the inlet section 104. The more even distribution of the DEF within the inlet section 104 further reduces the risk of DEF film and buildup formation on the components of system 100. Each of the injector ports 504 may be of uniform size and shape or may have different sizes and/or shapes. Although only one injector insert 502 is shown in the inlet section 104, multiple injector inserts 502 may be arranged in series along the length of the inlet section 104. In such arrangement, the injector inserts 502 may be arranged at different angles within the inlet section with respect to the central axis of the inlet section 104.

Figure 6:
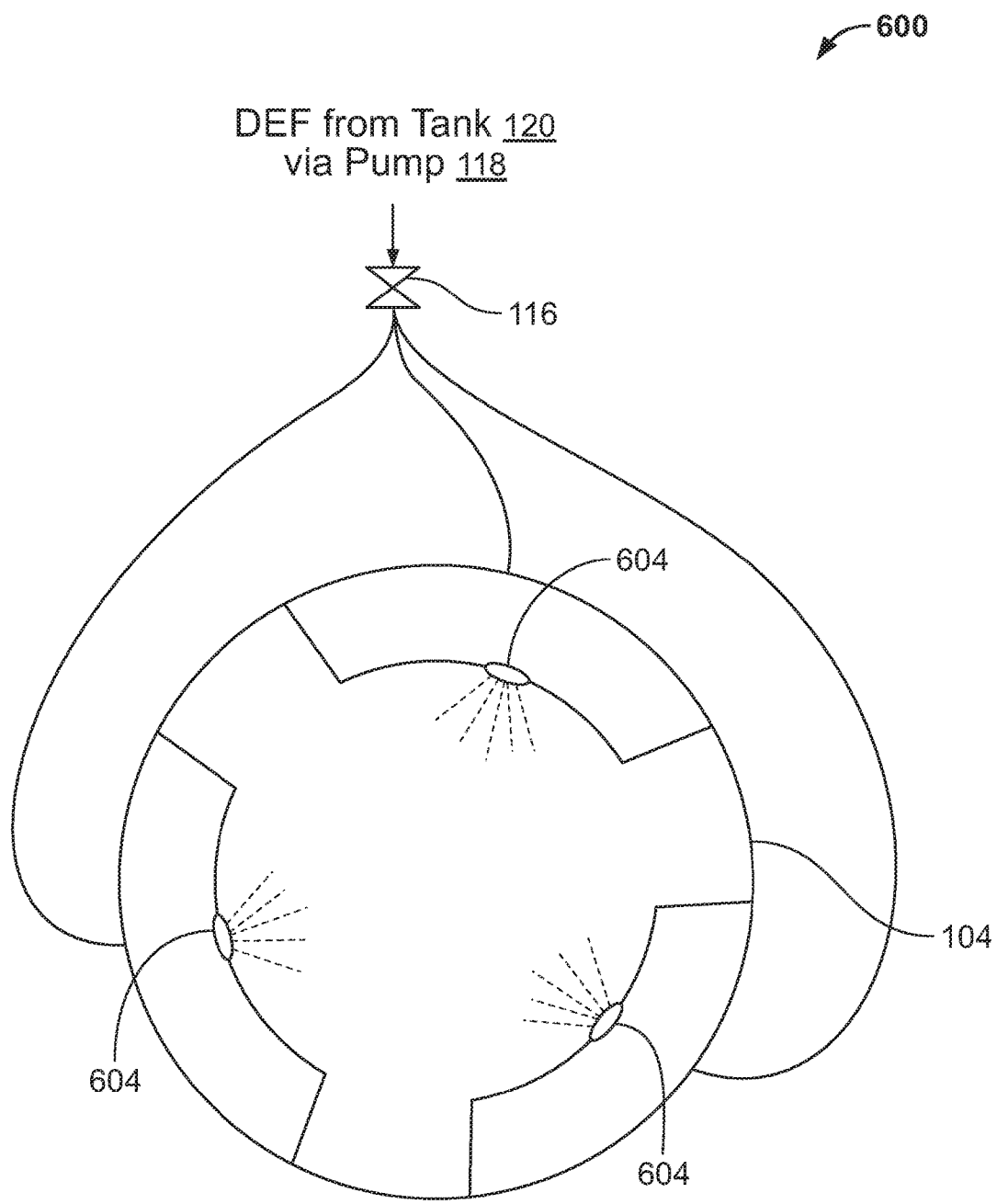

Referring to FIG. 6, a cross-sectional view of the inlet section 104 is shown with yet another exemplary injector arrangement 600. The injector arrangement 600 includes a plurality of injector inserts 602. Each injector insert 602 is shaped like a sector of an annulus and is coupled to the interior wall of the inlet section 104. Each injector insert 602 includes an injector port 604. Each injector insert 602 is in fluid communication with the valve 116 such that the valve 116 provides each injector insert 602 with DEF from the tank 120 to each injector 114 via the pump 118. The provided DEF flows into the injector inserts 602 and out the injector ports 604 into the inlet section 104. In an alternative arrangement, each injector insert 602 is associated with a dedicated valve 116 such that each injector insert 602 is independently controllable by the controller 122. The injector inserts 602 are oriented at different angles within the inlet section 104 about the center of the inlet section 104, which provides for a more even distribution of the DEF within the inlet section 104. The more even distribution of the DEF within the inlet section 104 further reduces the risk of DEF film and buildup formation on the components of system 100. Each of the injector ports 604 may be of uniform size and shape or may have different sizes and/or shapes. Although only a single set of injector inserts 602 is shown in the inlet section 104, multiple sets of injector inserts 602 may be arranged in series along the length of the inlet section 104. In such arrangement, the injector inserts 602 may be arranged at different angles within the inlet section with respect to the central axis of the inlet section 104.

Referring again to FIG. 1, the controller 122 controls the operation of the system 100. As diesel fuel is combusted by the engine and exhaust gas 102 flows through the system 100, the controller 122 determines how much DEF is required to be injected into the inlet section 104 based on how much $NO_X$ is generated by the engine. The amount of $NO_X$ generated by the engine varies based on engine operating parameters, such as engine speed, engine load, air quality, fuel quality, and other parameters. The controller 122 receives feedback from the engine (e.g., from the engine ECU, from sensors coupled to the engine, etc.) and feedback from the sensors 124 to determine how much DEF is required by the system 100 as a function of time. The controller 122 integrates the amount of DEF required as a function of time to determine a total amount of DEF required for a given time period. When the total amount of DEF required is approximately equal to a threshold amount of DEF (e.g., the amount of DEF provided by the constant volume dose), the controller 122 instructs the pump 118 and valve 116 to inject the constant dose into the inlet section 104. As the engine operation varies, the amount of time it takes to reach the threshold amount of DEF varies. Accordingly, the amount of time between constant volume doses via the injector 114 varies. In some arrangements, the controller 122 predicts a future amount of $NO_X$ generated by the engine such that the controller 122 is one or two doses of DEF ahead of the actual requirement. In such arrangements, the system 100 better handles DEF deficit situations (e.g., situations in which there is a sudden jump of actual $NO_X$ in the exhaust gases 102 and the system is behind in treating the $NO_X$ with DEF) by introducing a surplus of DEF into the system. In other arrangements, the system 100 mitigates the risk of DEF deficit situations by including an ammonia storage component that stores ammonia within the inlet section 104 or the catalyst assembly 106. In such arrangements, the stored ammonia is used to treat the exhaust gases 102 during periods of increased $NO_X$ content. The amount of ammonia stored can be tailored to minimize ammonia slip from the system 100.

The variable time interval between successive pulses of DEF assists in preventing DEF film and deposit formation within the inlet section 104 and the catalyst assembly 106. During low temperature operations, a fixed time interval, variable volume DEF dosing system is susceptible to high DEF dose volume error (as described above). In some situations, this error results in significant amounts of excess DEF, which may not break down into ammonia during the low temperature operation. The excess DEF may form deposits or films on interior portions of the inlet section 104 and the catalyst assembly 106, which can reduce the system's efficiency in treating $NO_X$. The system 100, however, has the timing flexibility to avoid excess pulses of DEF when the pulse of DEF is not needed, which also helps to control surface temperatures of the inlet section 104 where the DEF is sprayed. Further, the constant volume pulses of DEF are more accurate than variable volume pulses. These factors combine to reduce the occurrence of excess DEF within the system 100, thereby reducing the risk of DEF deposits or films forming on the various exhaust aftertreatment components.

The system 100 is modular such that additional systems can be used with the same exhaust aftertreatment system if a higher volume of DEF is required than can be delivered through a single SCR system. For example, in a high horsepower diesel engine, large amounts of diesel fuel are combusted to generate power. Accordingly, the high horsepower diesel engine generates larger than normal amounts of $NO_X$ when compared to a normal or small sized diesel engine. Multiple SCR systems 100 may be employed along the exhaust system of the high horsepower diesel engine.

Referring to FIGS. 7 through 12, test data for a differential DEF dosing system (e.g., system 100 as described above with respect to FIGS. 1 through 6) is shown. FIGS. 7 through 10 highlight normal testing conditions for 1230 ms (1.23 seconds). The test data is generated by dosing the exhaust from a 2013 ISL 450 horsepower, hot FTP cycle diesel engine with a constant dosing quantity of 0.40 mL at variable times based on the amount of $NO_X$ in the exhaust stream. In a variable quantity, fixed time DEF dosing system that operates at 1 Hz (e.g., 1000 doses of DEF per second), 1230 doses would be required at varying dose amounts. In the above-described constant quantity, variable time DEF dosing system (e.g., system 100), only 322 doses are required at the fixed quantity. As shown in FIG. 9, the number of doses per time period varies throughout the duration of the 1230 ms of operation. Groupings of high numbers of doses during short time periods (e.g., as shown from approximately 800 ms to 850 ms) represent periods where the DEF deficit is greater than the DEF pulse quantity. The areas of DEF deficit are treated with multiple pulses of the DEF dosing system. In a correctly programmed system, DEF deficit should not occur. In such a system, the controller (e.g., controller 122) is actuated at least one pulse ahead of the actual requirement of DEF, which results in a slight surplus of ammonia in the exhaust system that acts as a buffer for periods of high engine use. In an alternative arrangement, ammonia storage within the exhaust system can be used as buffer for periods of high engine use to eliminate DEF deficit.

Figure 12:
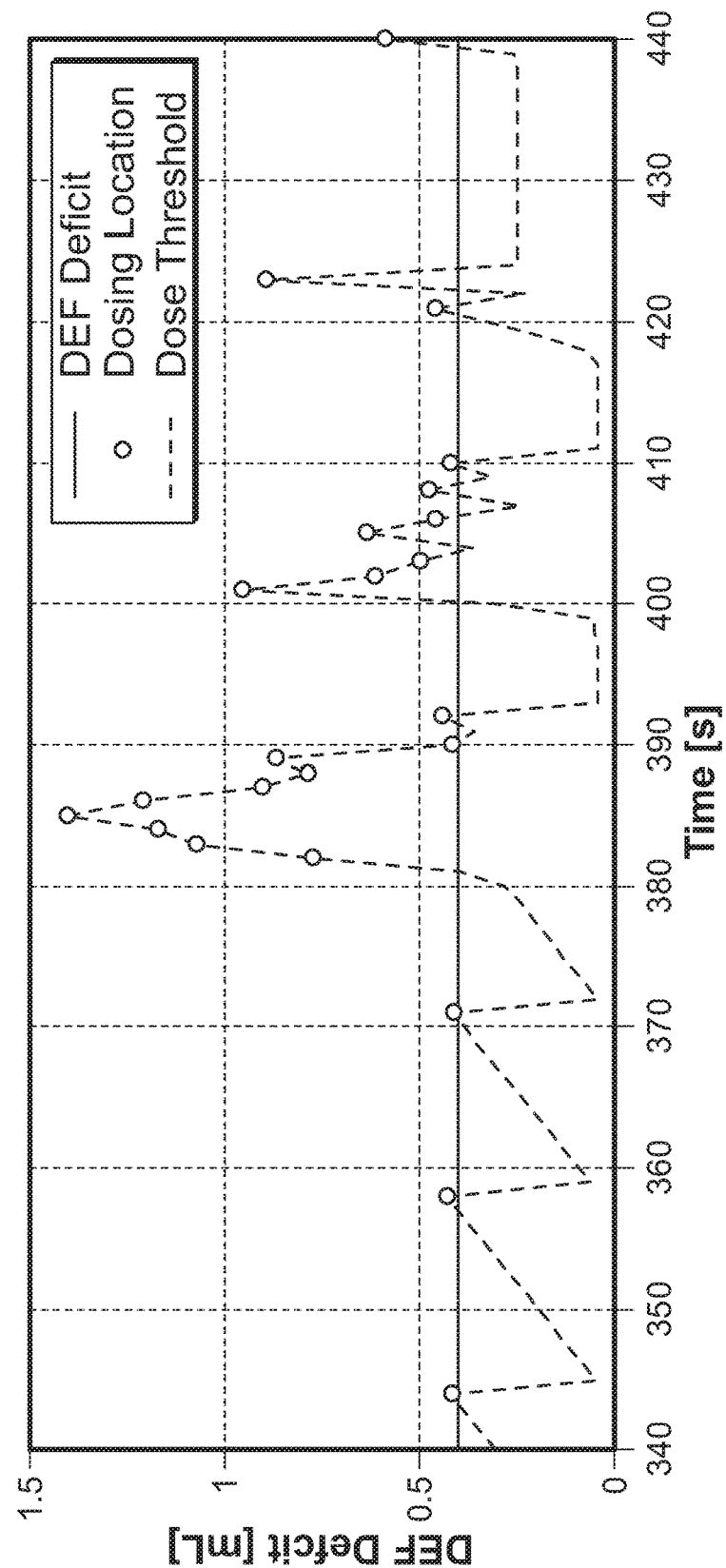

FIGS. 11 and 12 highlight the above-described test data during a catch-up situation. A catch-up situation occurs where a DEF deficit exists and the controller "catches up" to the DEF deficit by initiating multiple back-to-back pulses of the DEF during short time periods. As shown best in FIG. 12, during non-DEF deficit operation (e.g., from 340 ms to 80 ms), the controller instructs a DEF dose when the total quantity of required DEF hits a threshold amount (labeled "Dose Threshold" in FIG. 12). However, during rapid increases in $NO_X$ generation (e.g., as caused during acceleration of a vehicle), the system may fall behind such that the quantity of required DEF remains above the threshold amount for an extended period of time (e.g., from 380 ms to 390 ms). In such situations, the controller instructs a rapid series of DEF pulses to bring the DEF deficit back down below the threshold amount.

Figure 13:
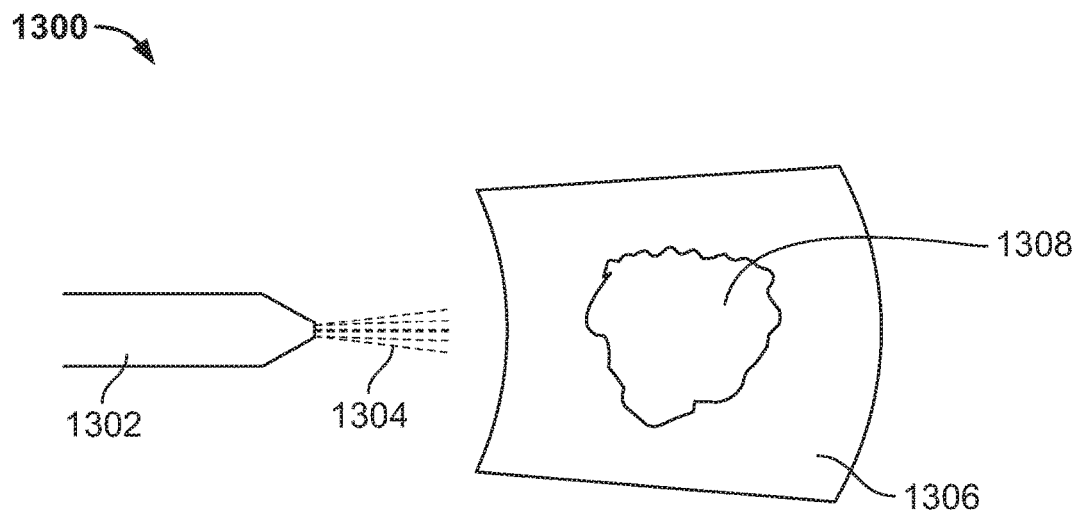
FIG. 13 is a schematic view of single reductant injector SCR system according to an exemplary embodiment.
Figure 14A:
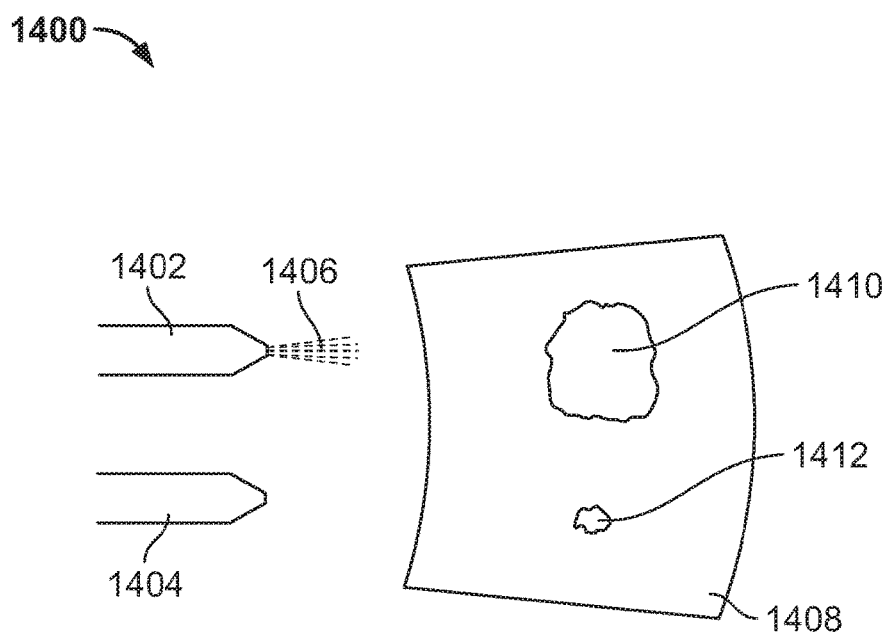
FIGS. 14A and 14B are schematic views of a two reductant injector SCR system according to an exemplary embodiment.
Figure 14B:
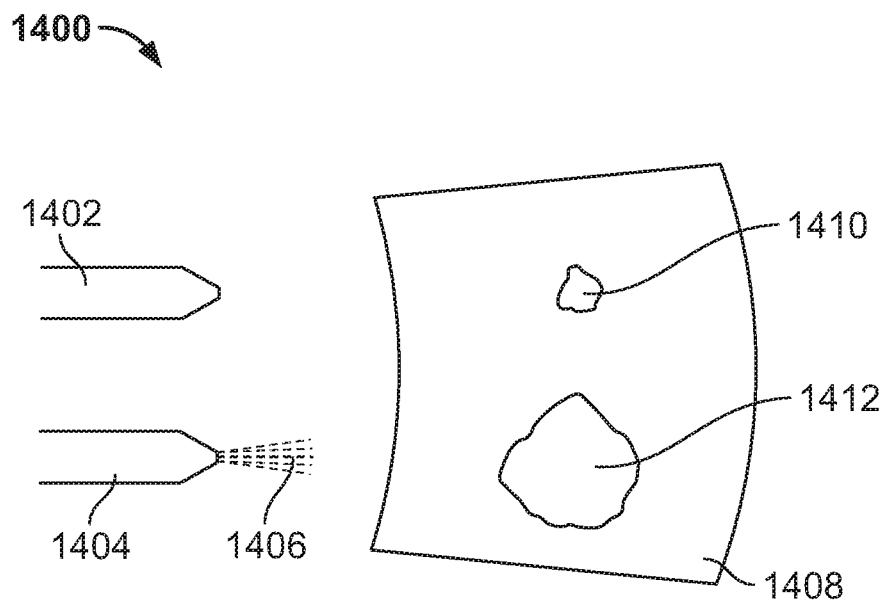
Figure 15:
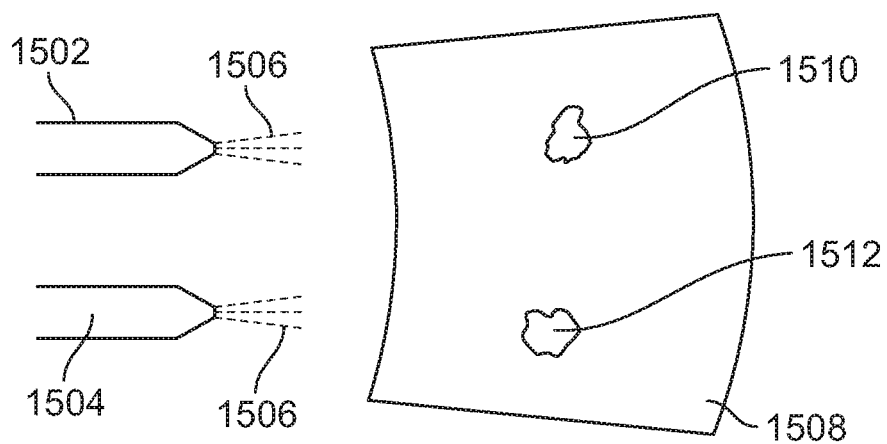
FIG. 15 is a schematic view of a two reductant injector SCR system according to another exemplary embodiment.

Referring to FIGS. 13 through 15, various schematic views of reductant deposit and film build-up situations within an exhaust aftertreatment system (e.g., an SCR system) are shown. FIG. 13 shows a schematic view of single reductant injector SCR system 1300. The system 1300 includes a reductant injector 1302 configured to inject a reductant 1304, such as DEF, into an exhaust component 1306. The reductant injector 1302 is fixed with respect to the exhaust component 1306. Accordingly, the reductant injector 1302 sprays the reductant 1304 at substantially the same spot on the exhaust component 1306. Under high temperature operating conditions, the reductant 1304 is heated by the exhaust gases and the residual heat stored in the exhaust component 1306. When the reductant 1304 receives enough thermal energy, the reductant 1304 at least partially breaks down into ammonia. However, under certain low temperature operating conditions (e.g., at idle engine conditions), the repeated sprayings of the reductant 1304 against the exhaust component 1306 can create a cold spot on the exhaust component 1306. The cold spot inhibits the breakdown of the reductant 1304 into ammonia. Accordingly, the cold spot may cause a buildup 1308 of reductant 1304 on the inner wall of the exhaust component 1306. The buildup 1308 may be a deposit or film of the reductant 1304.

As shown in FIGS. 14A and 14B, the constant buildup of the deposit 1308 of FIG. 13 can be mitigated through the use of multiple injectors. FIGS. 14A and 14B each show a schematic view of a two reductant injector SCR system 1400 according to an exemplary embodiment. FIG. 14A shows the system 1400 at a first time period, and FIG. 14B shows the system 1400 at a second time period. As shown in FIG. 14A, the system 1400 includes a first reductant injector 1402 and a second reductant injector 1404. The first and second injectors 1402 and 1404 are configured to inject a reductant 1406, such as DEF, into an exhaust component 1408 of an exhaust aftertreatment system. As discussed above with respect to system 1300, under certain low temperature operating conditions (e.g., at idle engine conditions), the repeated sprayings of the reductant 1406 against the exhaust component 1408 can create cold spots on the exhaust component 1408. The cold spot inhibits the breakdown of the reductant 1406 into ammonia. Accordingly, the cold spot may cause buildups 1410 and 1412 of reductant 1406 on the inner wall of the exhaust component 1408. The buildups 1410 and 1412 may be a deposit or film of the reductant 1406. The first buildup 1410 is associated with reductant 1406 sprayed from the first injector 1402. The second buildup 1412 is associated with reductant 1406 sprayed from the second injector 1404 (e.g., as shown in FIG. 14B).

The first injector 1402 and the second injector 1404 are independent actuable (e.g., the first injector 1402 is associated with a first dedicated valve, and the second injector 1404 is associated with a second dedicated valve). Accordingly, reductant 1406 may be selectively sprayed from either the first injector 1402 or the second injector 1404 at different times (e.g., only one of the injectors 1402 or 1404 is spraying reductant 1406 at any given time). When reductant 1406 is being sprayed from the first injector 1402, the first buildup 1410 may build while the second buildup 1412 has time to heat and decompose (e.g., as shown in FIG. 14A). Accordingly, when the first injector 1402 is activated and the second injector 1404 is idle, the first buildup 1410 may grow under low temperature operations, and the second buildup 1412 may shrink. Conversely, when reductant 1406 is being sprayed from the second injector 1404, the second buildup 1412 may build while the first buildup 1410 has time to heat and decompose (e.g., as shown in FIG. 14B). Accordingly, when the first injector 1402 is idle and the second injector 1404 is activated, the first buildup 1410 may shrink, and the second buildup 1412 may grow under low temperature operations. Such an arrangement prevents large deposits and films of reductant 1406 from remaining on the exhaust component 1408 by allowing time for any formed deposits and films to break down without reducing the capacity of the system 1400.

The splitting of reductant 1406 between the first injector 1402 and the second injector 1404 can be controlled in various ways. A first way to control when to alternate reductant 1406 injections between the first injector 1402 and the second injector 1404 is to alternate after each dose. A second way of control when to alternate reductant 1406 injections between the first injector 1402 and the second injector 1404 is to alternate after a threshold amount of reductant has been injected by either injector. A third way to control when to alternate reductant 1406 injections between the first injector 1402 and the second injector 1404 is to measure the size of the buildups 1410 and 1412 and switch between injectors when the associated buildup reaches a threshold size (e.g., a threshold thickness, a threshold surface area, etc.). The measurement of the buildups 1410 and 1412 may be accomplished with a sensor or another device.

A fourth way to control when to alternate reductant 1406 injections between the first injector 1402 and the second injector 1404 is monitor the exhaust gases for unusual changes in ammonia slip, unusual increases in $NO_X$ downstream of the system 1400, or increased pressure restriction of the system 1400 (caused by the increased buildup of reductant 1406) and switch between injectors when an appropriate indicator is detected. A fifth way to control when to alternate reductant 1406 injections between the first injector 1402 and the second injector 1404 is to measure the surface temperature of the exhaust component 1408 and to switch between injectors when the surface temperature falls below a threshold temperature. In some arrangements, the threshold temperature is the critical temperature required to break down the reductant 1406 into ammonia.

Referring to FIG. 15, a schematic view of a two reductant injector SCR system 1500 is shown according to another exemplary embodiment. The system 1500 includes a first reductant injector 1502 and a second reductant injector 1504. The first and second reductant injectors 1502 and 1504 are configured to inject a reductant 1506, such as DEF, into an exhaust component 1508 of an exhaust aftertreatment system. As discussed above with respect to system 1300, under certain low temperature operating conditions (e.g., at idle engine conditions), the repeated sprayings of the reductant 1506 against the exhaust component 1508 can create cold spots on the exhaust component 1508. The cold spot inhibits the breakdown of the reductant 1506 into ammonia. Accordingly, the cold spot may cause buildups 1510 and 1512 of reductant 1506 on the inner wall of the exhaust component 1508. The buildups 1510 and 1512 may be a deposit or film of the reductant 1506. The first buildup 1510 is associated with reductant 1506 sprayed from the first reductant injector 1502. The second buildup 1512 is associated with reductant 1506 sprayed from the second reductant injector 1504. Unlike system 1400, the first reductant injector 1502 and the second reductant injector 1504 each spray reductant 1506 at the same time. Since both injectors 1502 and 1504 are utilized concurrently, each injector 1502 and 1504 only sprays half of the total dose amount. Accordingly, the entire dose of reductant 1506 is spread across a larger surface area of the exhaust component 1508 thereby reducing the size of any cold spots formed on the exhaust component 1508. Since the cold spots are reduced, the size of the buildups 1510 and 1512 is also minimized.

Although systems 1400 and 1500 are shown as including two injectors, any number of injectors greater than one may be used. The higher number of injectors used, the more effective the systems 1400 and 1500 are at reducing or eliminating films and buildups of the reductant.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "example" and/or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or as computer instructions on a non-transient computer readable storage medium, and modules may be distributed across various hardware or computer based components. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An aftertreatment system for treating exhaust gas in an inlet exhaust pipe of an internal combustion engine using a reductant, the aftertreatment system comprising:
   a pump configured to receive the reductant;
   an injector configured to inject the reductant in a plurality of constant volume pulses into the exhaust pipe, each of the plurality of constant volume pulses having a volume;
   a sensor configured to determine a characteristic of the exhaust gas; and
   a controller configured to:
     receive the characteristic from the sensor;
     determine a dosage rate of the reductant based on the characteristic;
     determine a dosage amount of the reductant by integrating the dosage rate over a target interval;
     compare the dosage amount to the volume;
     initiate a timer indicating a time, in response to determining that the dosage amount is greater than the volume;
     compare the time indicated by the timer to a timer threshold;
     cause the injector to inject the reductant in one of the plurality of constant volume pulse in response to determining that the dosage amount is greater than the volume;
     after causing the injector to inject the reductant in the one of the plurality of constant volume pulses, cause the injector to inject the reductant in another of the plurality of constant volume pulses in response to determining that the time indicated by the timer is greater than the timer threshold; and
     reset the time indicated by the timer in response to determining that the dosage amount is not greater than the volume.

2. The aftertreatment system of claim 1, wherein the reductant comprises diesel exhaust fluid.

3. The aftertreatment system of claim 1, further comprising a catalyst assembly including a selective catalytic reduction catalyst and an ammonia slip catalyst.

\* \* \* \* \*